H. MARTIN.
MANOMETER.
APPLICATION FILED AUG. 23, 1916.
1,320,484.
Patented Nov. 4, 1919.
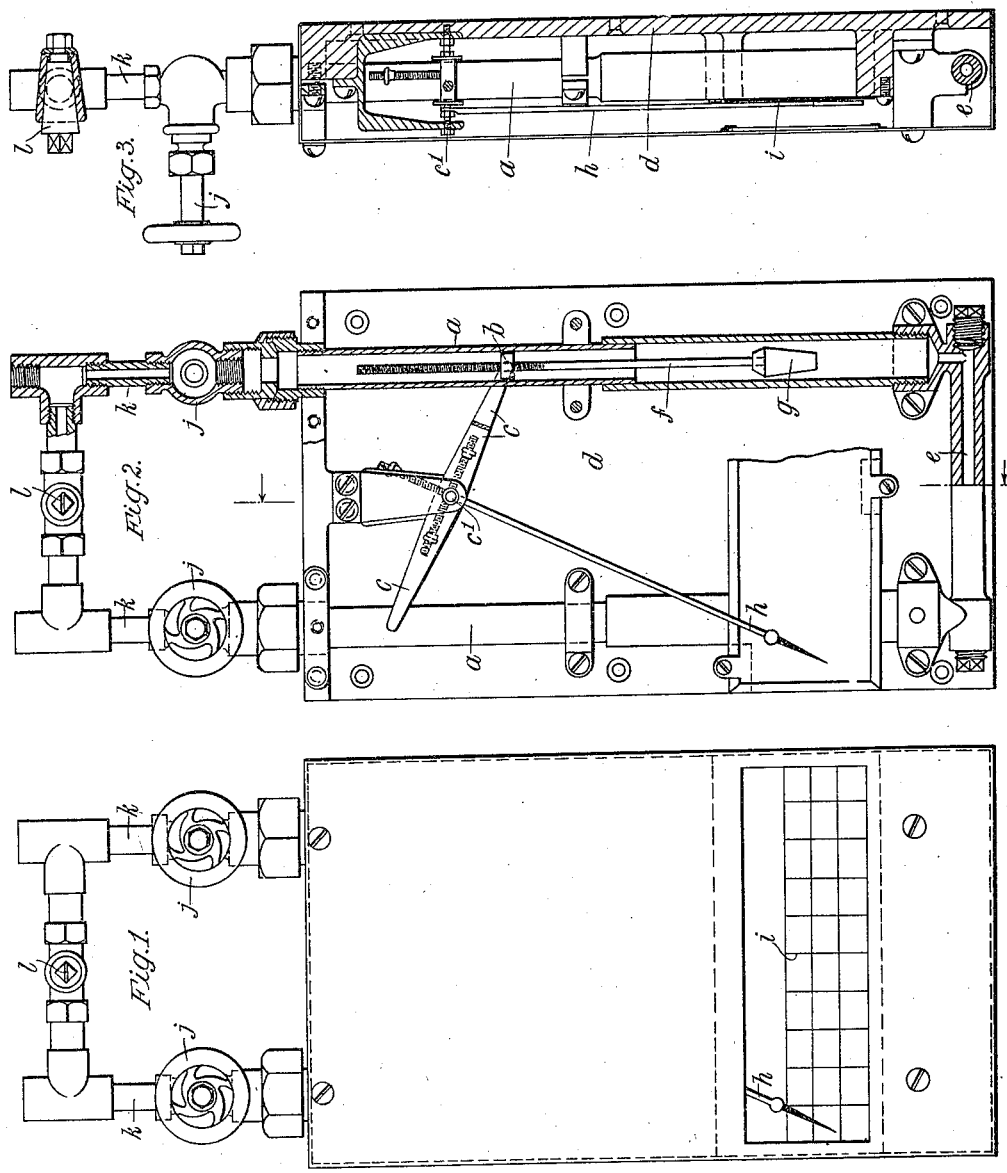
Inventor
Harold Martin
By
Attorney

UNITED STATES PATENT OFFICE.

HAROLD MARTIN, OF DULWICH, LONDON, ENGLAND.

MANOMETER.

1,320,484. Specification of Letters Patent. Patented Nov. 4, 1919.

Application filed August 23, 1916. Serial No. 116,548.

*To all whom it may concern:*

Be it known that I, HAROLD MARTIN, a subject of His Majesty the King of England, and resident of 29 Barry road, Dulwich, in the county of London, Kingdom of England, have invented certain new and useful Improvements in Manometers, of which the following is a specification.

This invention, for which application was filed in France on August 16, 1916, resulting in French Patent 482,571, relates to improvements in manometers of the kind in which an iron float in one or both branches or legs of a U-column of mercury serves to control the position of a pivotally mounted magnet disposed outside the tube or tubes and which carries a pointer or indicator.

Heretofore it has been the common practice to make one or both of the branches of the U-tubes wholly or partly of glass, and it is the primary object of the present invention to provide a device in which the glass is entirely eliminated and in which one or more of the branches or legs of the U-tube is of composite form being formed partly of one metal and partly of another the lower portion being of iron or other metal inactive with mercury, and the upper portion in the vicinity of the magnet being of copper or other non-magnetic metal as hereinafter described.

Another object of the present invention is the provision of a manometer of the above kind in which each armature is carried by its float through the intermediary of a rod.

A further object of the present invention is the provision of a manometer comprising a composite metal U-tube of iron and copper, mercury in the lower or iron portion of the said tube, an armature or its equivalent floating on or from the mercury in each branch of the U-tube, an external magnet or its equivalent pivoted between the upper non-magnetic portions of the tubes so as to coöperate with the said armatures and follow the movements thereof, and a pointer or pen for indicating on a scale or recording on a chart the divisions of which are directly proportional to the movements due to the difference in level of the ends of the columns of mercury.

The present invention is illustrated in, and hereinafter described with reference to the accompanying drawings, in which:—

Figure 1 is a general outside front elevation of a manometer having connections thereon, particularly adapted for use in connection with steam generators.

Fig. 2 is an elevation corresponding to the preceding figure but showing the whole of the outside casing removed and the right half of the tube and mechanism in section; and Fig. 3 is a sectional side elevation of the said device.

As shown, and in a manometer according to this invention the tubes $a$ $a$ containing the mercury column are of metal. In each tube $a$ is an iron armature $b$ floated on or from the mercury; and an external magnet system conveniently consisting of a pair of permanent magnet bars $c$ coöperates with one or both of said armatures $b$ to follow the movements thereof. The lower part of the tubes $a$ $a$ with which the mercury makes contact is made of iron or other metal inactive with mercury. The upper part in the vicinity of the magnet is of copper or other non-magnetic metal. The tubes $a$ $a$ are secured to a base or wall plate $d$ and have a cross connecting channel $e$ or they may be otherwise suitably connected at their lower ends.

As shown, each of the armatures $b$ is carried on a rod $f$ extending from the actual float $g$ which latter may be of iron.

Preferably, an astatic pair of magnets $c$ is used, pivoted at $c'$ between the two tubes $a$ $a$ with one magnet bar behind and one magnet bar in front of the said tubes. The magnet system may have attached to it a pointer $h$ for indicating on a scale $i$ or a pen for marking a recording chart. With a magnet $c$ pivoted as described the graduations of the scale or chart are uniform.

In the arrangement shown each tube $a$ is provided with a screw down valve $j$ to facilitate the connecting up of the manometer to high pressure steam lines and between the two connecting pipes $k$ is also provided an equalizing stop valve $l$ for enabling the zero of the instrument to be readily checked when in use.

It will be obvious that the magnet system could be reversed if desired by making the members $b$ permanent magnets and the members $c$ to serve as armatures.

What I claim is:—

1. A manometer comprising a composite U-tube containing mercury and having one of its legs formed partly of one metal inactive with mercury, and partly of another and non-magnetic metal, a float and an armature carried thereby in said tube, a pivotally mounted magnet disposed outside of said tube and coöperating with said float and armature, and an indicator controlled by said magnet.

2. A manometer comprising a composite U-tube having both of its legs formed partly of one metal and partly of another, floats carrying armatures in said tubes, a pivotally mounted magnet disposed outside of said tubes and coöperating with said floats and armatures, and a pointer or indicator controlled by said magnet.

3. A manometer comprising a composite metal U-tube of iron and copper, mercury in the lower or iron portion of the said tube, an armature floating with the mercury in each branch of the U-tube, an external magnet or its equivalent pivoted between the upper non-magnetic portions of the tubes so as to coöperate with the said armatures and follow the movements thereof, and a pointer or pen for indicating on a scale the divisions of which are directly proportional to the movements due to the difference in level of the ends of the columns of mercury substantially as described.

4. A manometer comprising a composite metal U-tube of iron and copper, mercury in the lower iron portion of said tube, a float in each of said tubes, an armature carried by each of said floats, an external magnet external to the said tubes and coöperating with the floats and armatures, and a pointer or pen carried by said magnet.

5. A manometer comprising a base, a U-tube having both of its legs formed of separable sections, one section of each leg being formed of iron and the other of copper, mercury in the iron portions of said legs, an armature floating with the mercury in each leg, an external magnet pivotally supported on the base so as to coöperate with said armatures and follow the movements thereof, and a pointer controlled by said magnet.

6. A manometer comprising a composite U-tube having both of its legs formed partly of one metal and partly of another, floats and armatures in said legs, a pivotally mounted magnet disposed outside of said tubes and coöperating with said floats, one end of said magnet operating in front of one leg with the opposite end of the magnet operating in the rear of the other leg, and a pointer controlled by said magnet.

In testimony whereof I have hereunto signed my name to this specification.

H. MARTIN.